March 2, 1954  J. B. CATALDO  2,671,152
ELECTRICAL FIXTURE
Filed April 16, 1952

INVENTOR
JOHN B. CATALDO
BY
Campbell, Brumbaugh, Free & Graves
ATTORNEYS

Patented Mar. 2, 1954

2,671,152

UNITED STATES PATENT OFFICE 2,671,152

ELECTRICAL FIXTURE

John B. Cataldo, Bernardsville, N. J., assignor to John B. Pierce Foundation, New York, N. Y., a corporation of New York Application April 16, 1952, Serial No. 282,615

1 Claim. (Cl. 200—168)

This invention relates to electrical fixtures and more particularly to fixtures adapted to be quickly and simply inserted in series with at least one electrical conductor of an electrical conduit.

Electrical fixtures, such for example as switches and like devices, are generally connected in electrical circuits by attaching electrical conductors to binding posts, lugs or other terminal means. Considerable time and skill may be required if satisfactory connections are to be made, and in many cases even perfectly executed connections are mechanically insecure. The development of electrical wiring systems utilizing flat, semi-rigid electrical strip conduits comprising, for example, a pair of heavy conductors embedded in a unitary insulating strip has created a need for new fixture designs and this invention is concerned with the design of fixtures which overcome many of the disadvantages of conventional fixtures used in conventional wiring systems.

Accordingly, it is an object of this invention to provide an improved electrical fixture which is both safe in its design and efficient in its mounting and installation characteristics.

It is another object of the invention to provide an electrical fixture which is particularly adaptable for use with semi-rigid strip wiring conduits including heavy electrical conductors held in fixed relative positions by means of moulded insulating material.

It is a further object of the invention to provide an improved electrical fixture which may be quickly and simply attached to electrical conductors and in which the possibility of the conductors being short circuited is obviated.

These and other objects and features of the invention may be obtained by providing an electrical fixture including a housing portion formed with internal recesses for receiving a strip conduit, and barrier means for insuring the continued separation of the electrical conductors within the fixture. The housing parts are preferably so arranged that the unit may not be assembled if the electrical conductors are improperly positioned within the housing. Suitable recesses are formed in the housing to receive connecting members for joining the electrical conductors with the terminal means of the fixture. These connecting members preferably comprise spring clip links which grip both the conductors and the terminal means, the gripping action being enhanced by the compressing action of the recesses formed in the housing. In a preferred embodiment of the invention channel means are provided in the housing for receiving an unsevered electrical conductor of the conduit which is permitted to pass directly through the fixture in such a way that the electrical conduit may itself carry tensile stresses which would ordinarily be borne exclusively by the terminal means of the fixture.

The invention may be better understood by reference to the accompanying drawing in which Fig. 1 is a top view of an electrical fixture formed in accordance with the present invention and shown attached to an electrical conduit;

Figure 1:
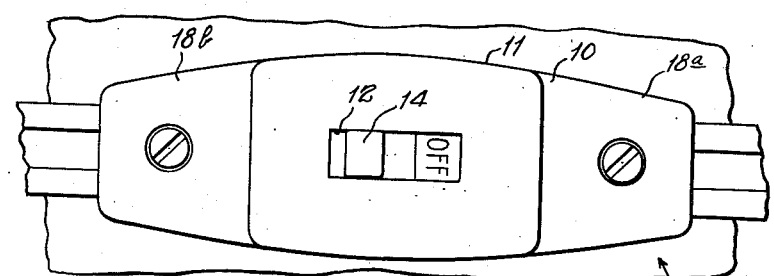
Figure 2:
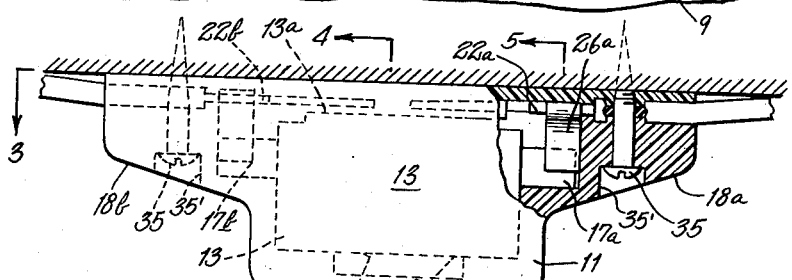
Fig. 2 is a side view partly in section of the fixture shown in Fig. 1.

For purposes of illustration the invention is shown as embodied in an electrical switch assembly identified generally by the numeral 9. The assembly includes a unitary, molded housing shell 10, which may be formed of plastic or other insulating material, having an enlarged central portion 11 formed with a slot 12 in its outer surface.

Received within the central portion 11 is an electrical device or element adapted to be connected in series with an electrical conductor and which may comprise, for example, a single-pole, double-throw switch unit 13 having an operating lever 14 which projects out of the slot 12 in the housing. Such switch devices are well known and any one of numerous conventional designs may be utilized. The electrical device 13 may be secured within the housing 10 by means, for example, of mounting screws 15 and supporting lugs 16 disposed at opposite ends of the unit. The device 13 is also provided with terminal means comprising a pair of blade members 17a and 17b formed of electrical conducting material and projecting outwardly from its respective ends and in the same plane.

The housing 10 is symmetrically formed with side portions 18a and 18b, and the underside of the housing is provided with wall means and abutments defining a longitudinal channel having end portions 19a and 19b. The channel is adapted to receive a strip conduit 20 which comprises a pair of parallel, coplanar heavy electrical conductors 21, 22, such as No. 10 or 12 wire, for example, embedded in a unitary insulating covering including rounded edges 23 joined by a central web portion 24. Such conduit is semi-rigid so that it may be made, if desired, to carry fixtures having no other means of support but is nevertheless capable of being bent to comply with the contours of the surfaces on which it is mounted. In most cases the conduit is mounted by means of fasteners penetrating the web portion 24 and entering a mounting surface such, for example, as a wall or base board.

Figure 5:
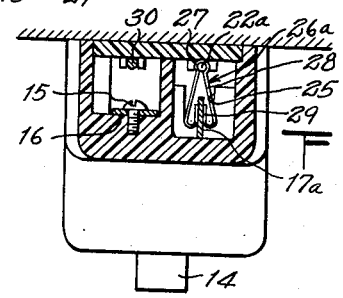
Fig. 5 is a view in transverse section taken on the line 5—5 of Fig. 2 looking in the direction of the arrows.
Figure 6:
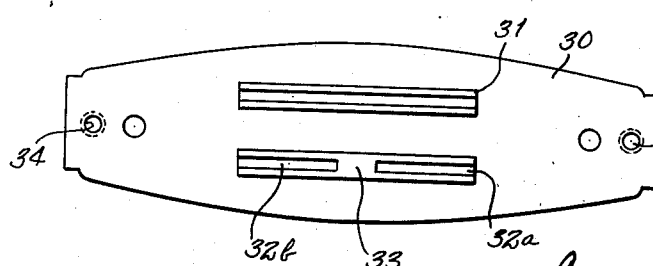
Fig. 6 is a plan view of the inside surface of the bottom cover member.

Within the confines of the housing 10 the insulation is stripped from the conductors 21 and 22. Further, the conductor 22 is severed so as to provide a pair of free end or conductor portions 22a and 22b which are preferably aligned and longitudinally spaced apart by removal of a piece of the conductor. The conductor portions 22a and 22b are adapted to be connected electrically to the terminals 17a and 17b of the electrical device 13. To this end, the housing 10 is formed with a pair of recesses 25 adjacent the respective conductor portions 22a and 22b. Joining the terminal blade 17a and the conductor end 22a, as best seen in Fig. 5, is an electrically conducting connector or clip member 26a having a rounded bight 27 adapted to surround the conductor 22a and having a pair of outwardly diverging leg portions 28, the free ends of which are inturned at 29 to form a reentrant channel for receiving the terminal blade 17a.

The clip 26a, when pressed into the channels 25, slidably engages the blade 17a in a tight clamping fit which also causes the clip to bind tightly at its bight 27 about the conductor portion 22a.

The conductor end 22b is similarly joined to the terminal blade 17b at the other side of the device 13 by a clip 26b so that the device is connected in series with the conductor 22.

The electrical device 13 is preferably provided with a flat insulating surface 13a on its back side which may be utilized as one of the surfaces defining the conduit-receiving channel within the housing 10 and adjacent which the bared conductors 21, and 22a and b of the conduit 20 may be disposed. The underside of the housing is adapted to be covered by a closure or back portion 30 carrying on its inner surface, wall means defining a first guide channel or slot 31 for receiving the through conductor 21 of the conduit 20, and a pair of aligned channels or slots 32a and 32b, divided by a barrier portion 33, for receiving the respective conductor portions 22a and 22b of the severed conductor 22. It will be understood that the construction of the channels insures that the conductor 22 is properly severed and separated at its severed ends, for the reason that the barrier 33 will prevent the proper seating of the closure portion 30 in the housing 10 unless an adequate gap is provided between the conductor ends 22a and 22b. When the closure portion 30 is properly seated in the housing the wall means defining the channels or slots 31 and 32a and b will be disposed close to the back surface 13a of the electrical device 13, thereby to effectively confine the bared electrical conductors on all sides. The closure portion 30 may be attached to the housing by means of screws received in holes 34.

Figure 3:
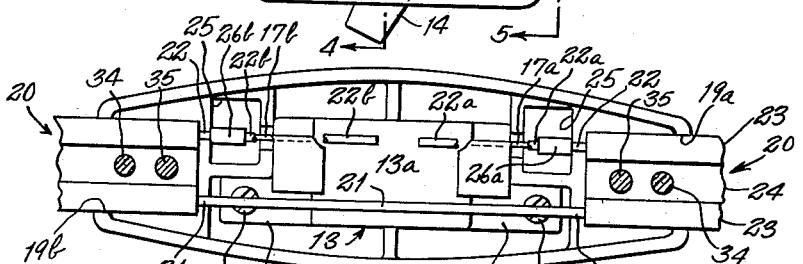
Fig. 3 is a bottom view of the fixture with the bottom cover member removed.
Figure 4:
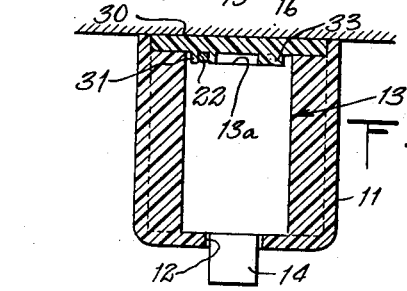
Fig. 4 is a view in transverse section taken on the line 4—4 of Fig. 2 looking in the direction of the arrows.

The fixture may be mounted on a supporting surface by means of mounting screws 35 received in countersunk bores 35' formed in the ends of the housing, the bores 35' being so positioned that the mounting screws 35 penetrate the web portion 24 of the electrical conduit 20, at best seen in Fig. 3.

It will be understood that the penetration of the web 20 by the mounting screws 35 tends to prevent the insulating portion of the conduit 20 from being pulled or stripped backwardly on the conductors.

Further, if tension is applied to the conduit 20 externally of the fixture, the tensile load will be carried both by the unsevered electrical conductor 21 and by the insulating portion which is attached to the housing 10 so that it is virtually impossible for the severed conductor 22 to become accidentally disconnected from the electric device 13.

The particular form of the invention herein described and illustrated in the accompanying drawings is presented merely as an example of how the invention may be applied. Numerous modifications in the details of the switch assembly may be made without departing from the scope of the invention. Thus, for example, various types of electrical devices may be utilized. Also, the unsevered conductor which passes through the housing need not necessarily be completely bared of insulation, particularly if it is not to be connected electrically within the fixture. Other forms, embodiments and applications of the invention coming within the proper scope of the appended claim will, therefore, suggest themselves to those skilled in the art.

I claim:

In an electrical fixture for use in conjunction with an electrical strip conduit comprising coplanar laterally spaced-apart parallel electrical conductors embedded in a unitary insulating portion, the conductors of the conduit being stripped of insulation for a length to be received within the fixture and at least one of the stripped conductors being severed by removal of a piece thereof to provide aligned longitudinally spaced-apart free end portions of the conductor, a housing, wall means in the housing defining a channel for receiving the stripped conduit in excess of the length stripped of insulation, said unsevered conductor passing through the housing without being bent, an electrical device mounted in the housing and having first and second electrical terminals and a flat insulating surface bounding at least a portion of the channel for the conduit, wall means defining recesses in the vicinity of the said terminals, a pair of electrically conducting clip members adapted to surround respectively the aligned free ends of the severed conductor and to be received in the recesses to engage the terminals of the electrical device to connect the device in series with the severed electrical conductor, and a closure portion adapted to be attached to the housing to close the conduit-receiving channel in the housing, said closure portion having walls defining channels for receiving the respective stripped electrical conductors of the conduit within the housing to hold the conductors in parallelism and to prevent lateral movement of the conductors, said wall means also defining a barrier portion adapted to be disposed between the aligned free ends of the severed conductor, said wall means, when the closure portion is in position, being disposed close to the said flat surface of the electrical device and cooperating therewith to confine the electrical conductors of the conduit, whereby the closure portion and housing may not be assembled in the absence of proper positioning of the electrical conductors within the housing, and whereby the electrical fixture may be attached to the strip conduit without bending either the severed or unsevered conductors.

JOHN B. CATALDO.

References Cited in the file of this patent
UNITED STATES PATENTS

| Number | Name | Date |
|---|---|---|
| 2,114,826 | Zelov | Apr. 19, 1938 |